United States Patent
Lorsignol et al.

(10) Patent No.: US 11,260,975 B2
(45) Date of Patent: Mar. 1, 2022

(54) PAIRED HERRINGBONE HIGH DENSITY BUSINESS CLASS SEATING ARRANGEMENT

(71) Applicant: Safran Seats GB Limited, Cwmbran (GB)

(72) Inventors: Felix J. Lorsignol, Pismo Beach, CA (US); Matthew Cleary, San Luis Obispo, CA (US)

(73) Assignee: Safran Seats GB Limited, Cwmbran (GB)

( * ) Notice: Subject to any disclaimer, the term of this patent is extended or adjusted under 35 U.S.C. 154(b) by 592 days.

(21) Appl. No.: 15/517,657

(22) PCT Filed: Oct. 7, 2015

(86) PCT No.: PCT/US2015/054568
§ 371 (c)(1),
(2) Date: Apr. 7, 2017

(87) PCT Pub. No.: WO2016/057725
PCT Pub. Date: Apr. 14, 2016

(65) Prior Publication Data
US 2017/0297719 A1     Oct. 19, 2017

Related U.S. Application Data

(60) Provisional application No. 62/060,874, filed on Oct. 7, 2015.

(51) Int. Cl.
*B64D 11/06* (2006.01)

(52) U.S. Cl.
CPC ...... *B64D 11/0601* (2014.12); *B64D 11/0602* (2014.12); *B64D 11/0606* (2014.12);
(Continued)

(58) Field of Classification Search
CPC ............ B64D 11/0601; B64D 11/0643; B64D 11/0627; B64D 11/0602; B64D 11/0606;
(Continued)

(56) References Cited

U.S. PATENT DOCUMENTS

D652,644 S  *   1/2012  Porter ........................... D6/356
8,864,071 B2 * 10/2014  Vergnaud ................. B60N 2/34
                                                          244/118.6

(Continued)

FOREIGN PATENT DOCUMENTS

GB        2510765 A       8/2014
WO       2010018367       2/2010
(Continued)

OTHER PUBLICATIONS

International Patent Application No. PCT/US2015/054568, Search Report and Written Opinion, dated Jan. 28, 2016.
(Continued)

*Primary Examiner* — Medhat Badawi
*Assistant Examiner* — Vicente Rodriguez
(74) *Attorney, Agent, or Firm* — Kilpatrick Townsend & Stockton LLP (57) ABSTRACT

Described are seating arrangements having at least one set of columns that include an aisle column of seating units positioned adjacent a wall column of seating units. The aisle column is positioned adjacent an aisle, and the wall column is positioned adjacent an exterior wall. Each seating unit has a bed position having a head end and a foot end, wherein at least a height-limited portion of the foot end is less than a delineating height that separates a lower portion of the aisle from a upper portion of the aisle. The seating units in the adjacent columns are longitudinally aligned and positioned adjacent one another, as well as being angled with respect to each other. The height-limited portion of the foot ends in the (Continued)

aisle column is positioned adjacent the aisle, and the height-limited portion of the foot ends in the wall column is positioned within a concave portion of the exterior wall.

18 Claims, 11 Drawing Sheets

(52) U.S. Cl.
CPC ...... *B64D 11/0627* (2014.12); *B64D 11/0641* (2014.12); *B64D 11/0643* (2014.12); *B64D 11/0639* (2014.12)

(58) Field of Classification Search
CPC .. B64D 11/0641; B64D 11/0639; B64D 11/06
See application file for complete search history.

(56) References Cited

U.S. PATENT DOCUMENTS

| | | | | |
|---|---|---|---|---|
| 9,126,689 | B2* | 9/2015 | Porter | B64D 11/06 |
| 9,162,766 | B2* | 10/2015 | Saint-Jaimes | B64D 11/06 |
| 9,446,848 | B2* | 9/2016 | Jerome | B60N 2/34 |
| 10,093,422 | B2* | 10/2018 | Braca | B64D 11/00153 |
| 2007/0069073 | A1* | 3/2007 | Ferry | B60N 2/309 |
| | | | | 244/118.6 |
| 2010/0065684 | A1* | 3/2010 | Ruiter | B64D 11/0601 |
| | | | | 244/118.6 |
| 2012/0305705 | A1 | 12/2012 | Vergnaud et al. | |
| 2013/0106156 | A1* | 5/2013 | Orson | B64D 11/064 |
| | | | | 297/217.3 |
| 2014/0306500 | A1* | 10/2014 | Dryburgh | B64D 11/06 |
| | | | | 297/232 |
| 2015/0166182 | A1 | 6/2015 | Ducreux et al. | |
| 2016/0083093 | A1* | 3/2016 | Tighe | B64D 11/06 |
| | | | | 244/118.6 |

FOREIGN PATENT DOCUMENTS

| | | |
|---|---|---|
| WO | 2010100500 | 9/2010 |
| WO | 2011067286 | 6/2011 |
| WO | 2013063599 A1 | 5/2013 |
| WO | 2014006607 | 1/2014 |
| WO | 2014049362 | 4/2014 |
| WO | 2014087387 | 6/2014 |

OTHER PUBLICATIONS

Europe Patent Application No. 15784242.8, Communication pursuant to Article 94(3) EPC (office action), dated Jul. 9, 2020.

* cited by examiner

PAIRED HERRINGBONE HIGH DENSITY BUSINESS CLASS SEATING ARRANGEMENT

CROSS REFERENCE TO RELATED APPLICATIONS

This patent application is the U.S. national stage of International Application No. PCT/US2015/054568 ("the '568 application"), filed on Oct. 7, 2015, which application is related to and claims priority benefits from U.S. Provisional Application Ser. No. 62/060,874 ("the '874 application"), filed on Oct. 7, 2014, entitled PAIRED HERRINGBONE HIGH DENSITY BUSINESS CLASS SEATING ARRANGEMENT. The '568 and '874 applications are hereby incorporated in their entireties by this reference.

FIELD OF THE INVENTION

The invention relates to seating arrangements for vehicle cabins and to the corresponding seat unit.

BACKGROUND

Common carriers, such as passenger airlines, bus lines, and train lines, often contain multiple seats in one or more cabins. Subject to their compliance with applicable safety regulations, seating arrangements may vary from carrier to carrier. Whereas passengers may prefer fewer seats per cabin to increase leg-room, privacy, or other factors associated with decreased seat density, common carrier operators may prefer greater seats per cabin to increase revenue per transport. Optimizing, or at least enhancing, both passenger comfort and revenue generation is a significant issue in cabin design and layout.

A high density business class seating arrangement generally consists primarily of seats that can be converted from an upright position to a bed position, while maintaining a "pitch per passenger" of greater than 9 and less than 10.5 for wide body aircraft. Pitch per passenger can be calculated by dividing the total number of passengers spanning the width of the aircraft by the pitch of the seat.

Various companies have created solutions to the problem of arranging passengers in the aircraft in such a way to maximize passenger count, while maintaining a high degree of passenger comfort, e.g. optimizing for bed space, storage space.

In one solution, as described in WO2014/087387 and WO2011/067286, pairs of seats are angled so that the heads of the passenger are farther apart and the feet are closer together. A drawback of this design is that, at least for the columns of seats adjacent the windows, the passengers' heads are positioned in the area of the cabin with the least head room due to the curved shape of the cabin exterior walls.

An alternative solution, described in WO2010/100500, is configured so that pairs of seats are angled so that the heads of the passenger are closer together and the feet are farther apart. However, in this configuration, because these seats are angled significantly to increase the density, each seat is partially surrounded by a privacy shell to compensate for the loss of privacy.

US 2012/0305705 also describes an arrangement where pairs of seats are angled so that the heads of the passenger are closer together and the feet are farther apart. In these arrangement, to increase seat density, the heads of the seats overlap in the bed position, which undermines the feeling of passenger privacy and comfort.

WO2010018367 describes an arrangement where the seats in a column are arranged with the same angle, but with an alternating forward and aft facing pattern.

Thus, it would be desirable to have a high density business class seating arrangement with the target pitch per passenger, while also providing an arrangement that maximizes the use of space below 25" and the space in the sidewall, while also preserving passengers' sense of comfort and privacy.

SUMMARY

The terms "invention," "the invention," "this invention" and "the present invention" used in this patent are intended to refer broadly to all of the subject matter of this patent and the patent claims below. Statements containing these terms should be understood not to limit the subject matter described herein or to limit the meaning or scope of the patent claims below. Embodiments of the invention covered by this patent are defined by the claims below, not this summary. This summary is a high-level overview of various aspects of the invention and introduces some of the concepts that are further described in the Detailed Description section below. This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings and each claim.

According to certain embodiments of the present invention, a seating arrangement comprises at least one set of columns comprising an aisle column of seating units positioned adjacent a wall column of seating units, wherein the aisle column is positioned adjacent an aisle, and the wall column is positioned adjacent an exterior wall. Each seating unit comprises a bed position having a head end and a foot end, wherein at least a height-limited portion of the foot end is less than a delineating height that separates a lower portion of the aisle from an upper portion of the aisle. The seating units in the adjacent columns are longitudinally aligned and positioned adjacent one another to form two-seat units, each two-seat unit comprising one seating unit from the aisle column and one seating unit from the wall column, which are angled with respect to each other so that a distance between the head ends is less than a distance between the foot ends. The height-limited portion of the foot ends in the aisle column of seating units is positioned adjacent the aisle so that the lower portion of the aisle below the delineating height is narrower than the upper portion of the aisle at or above the delineating height. The height-limited portion of the foot ends in the wall column of seating units is positioned within a concave portion of the exterior wall.

In some embodiments, the seating unit comprises a longitudinal axis that forms an angle with a center axis of the two-seat unit. Each angle may have a magnitude of 5 degrees to 15 degrees. In some embodiments, the angle of each seating unit in the aisle column is equal in magnitude and opposite in direction to the angle of each seating unit in the wall column.

According to some embodiments, the width of the aisle at the below the delineating height is the minimum required width of an aircraft aisle below the delineating height. The width of the aisle at the height below the delineating height may be 15 inches. The delineating height may be 25 inches.

In certain embodiments, the width of the aisle at or above the delineating height is the minimum required width of an aircraft aisle at or above the delineating height. The width of the aisle at or above the delineating height may be 21 inches. The delineating height may be 25 inches.

In certain embodiments, a lateral dimension of the height-limited portion of each foot end is approximately 1 inch to approximately 5 inches.

The seating arrangement may have a pitch per passenger of greater than 9 and less than 10.5.

In some embodiments, the bed positions of the seating units in the aisle column and the bed positions of the seating units in the wall column do not overlap. In further embodiments, the bed positions of the seating units are all arranged at substantially the same height.

In some embodiments, the seating arrangement further comprises a second set of columns, wherein the aisle column is positioned adjacent the aisle, and the wall column is positioned adjacent a second exterior wall. In these embodiments, the seating arrangement may be positioned in a narrow body aircraft.

In some embodiments, the seating arrangement further comprises a third set of columns and a second aisle, wherein the aisle column and the wall column are positioned between the two aisles. In these embodiments, the seating arrangement may be positioned in a wide body aircraft.

DETAILED DESCRIPTION

The subject matter of embodiments of the present invention is described here with specificity to meet statutory requirements, but this description is not necessarily intended to limit the scope of the claims. The claimed subject matter may be embodied in other ways, may include different elements or steps, and may be used in conjunction with other existing or future technologies. This description should not be interpreted as implying any particular order or arrangement among or between various steps or elements except when the order of individual steps or arrangement of elements is explicitly described.

While the embodiments of vehicle seats may be described with reference to an aircraft seat, they are by no means so limited. In fact, the seats may be used in conjunction with any type of vehicle or otherwise as desired.

According to certain embodiments of the present invention, as shown in FIGS. 1-11, a cabin 14 may include a seating arrangement 10 of a plurality of seating units 12A, and a plurality of seating units 12B.

Figure 7:
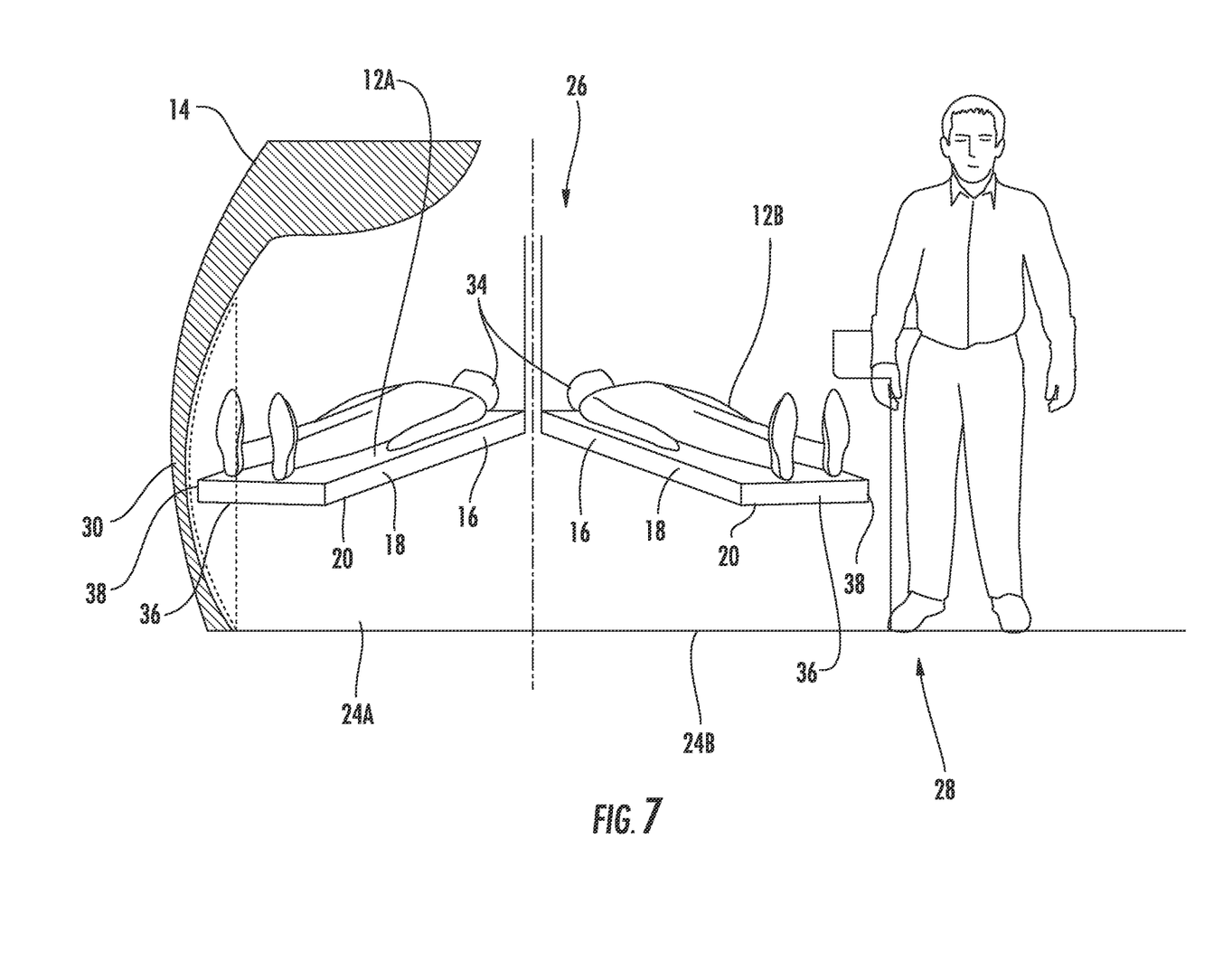
FIG. 7 is a perspective view of a two-seat unit in a bed configuration, according to certain embodiments of the present invention.
Figure 8:
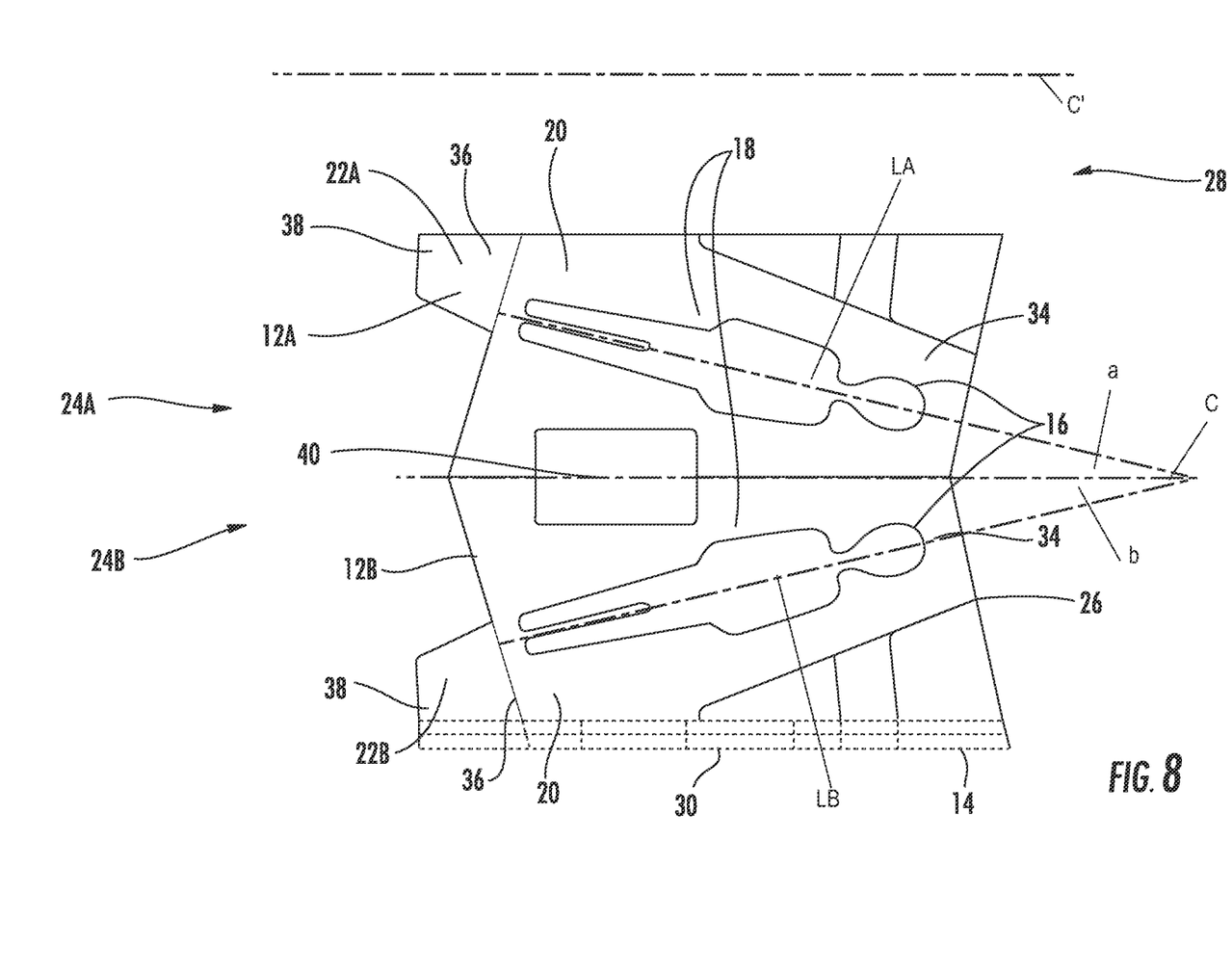
FIG. 8 is a top view of a two-seat unit in a bed configuration, according to certain embodiments of the present invention.
Figure 9:
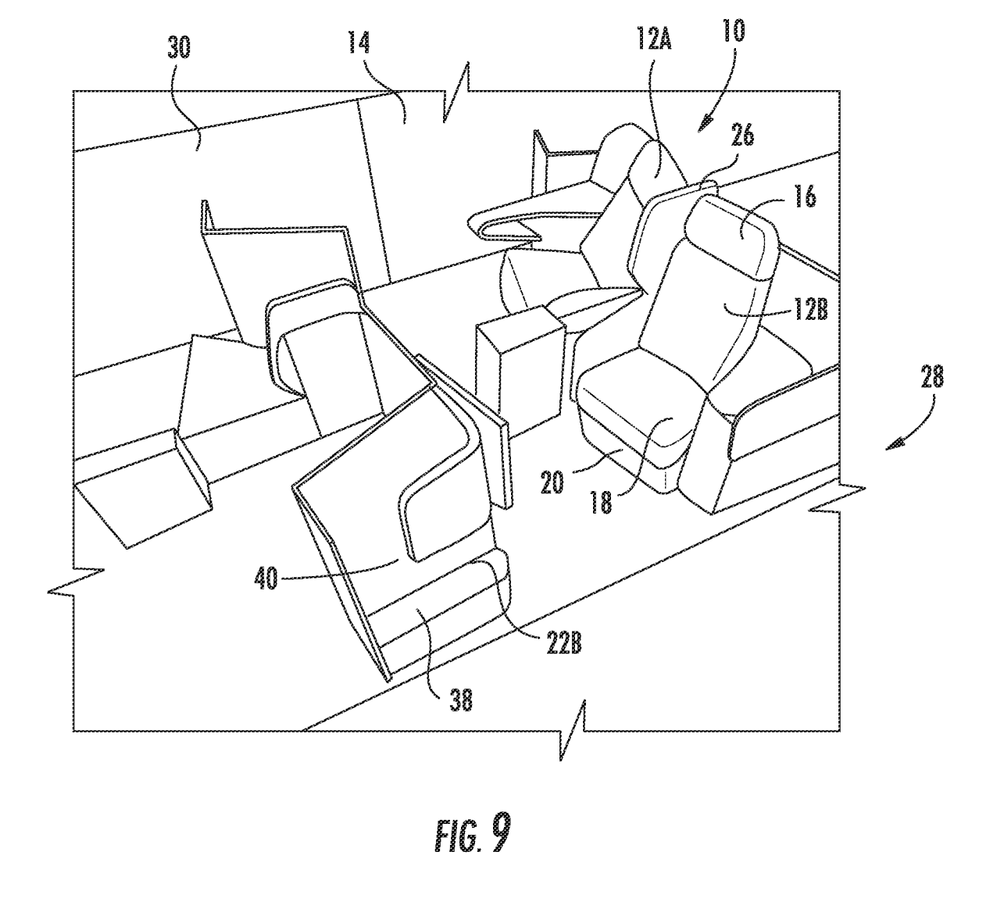
FIG. 9 is a front perspective view of a two-seat unit in an upright configuration, according to certain embodiments of the present invention.
Figure 10:
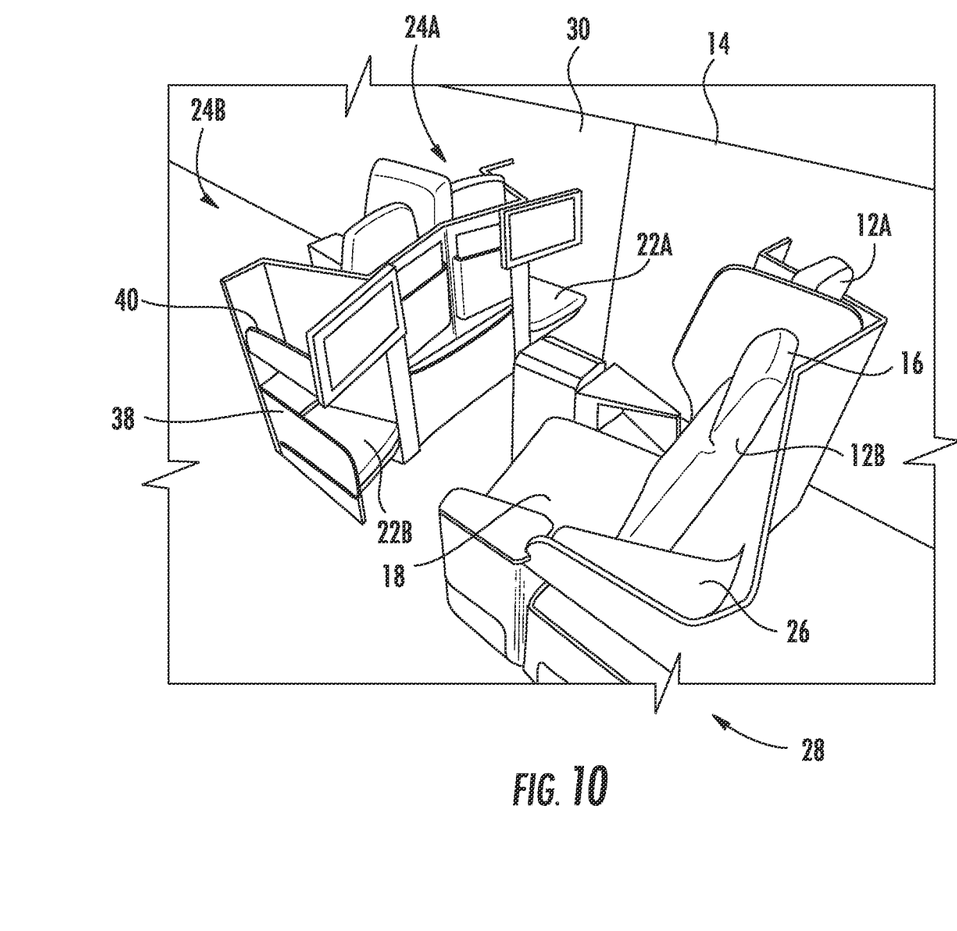
FIG. 10 is a rear perspective view of a two-seat unit in an upright configuration, according to certain embodiments of the present invention.

According to certain embodiments, each seating unit 12A, 12B comprises a seat back 16, a seat pan 18, and a leg rest 20, which are configured to convert from an upright or reclined chair position to a substantially horizontal position, also commonly referred to as a bed position, as shown in FIGS. 7-8. In some cases, the angle of the bed position may be completely horizontal or may have a slightly angled position, in which the bed may be angled 2 degrees-8 degrees when in flight relative to a completely 180 degree horizontal position when in flight.

Because the combined length of the seat back 16, seat pan 18, and the leg rest 20 in the bed position is typically not long enough for a passenger to lie down in a horizontal position, the leg rest 20 of each seating unit 12A, 12B in the bed position may configured to be positioned proximate a foot well 22A, 22B. Each foot well 22A, 22B is positioned in front of the corresponding seating unit 12A, 12B. As a result, the combined seating unit 12A, 12B in the bed position and the associated foot wells 22A, 22B provide a comfortable sleeping length for a passenger to lie down in a horizontal position. In any event, each bed position comprises a head end 34 and a foot end 36.

The seating units 12A are longitudinally arranged in at least one column 24A, and the seating units 12B are longitudinally arranged in at least one column 24B. In certain embodiments, the columns 24A, 24B are positioned adjacent one another so that the seating units 12A, 12B in each column 24A, 24B are longitudinally aligned and positioned adjacent one another to form two-seat units 26, each two-seat unit 26 comprising one seating unit 12A from column 24A and one seating unit 12B from column 24B.

In certain embodiments, as best illustrated in FIG. 8, the seating units 12A may form a longitudinal axis LA, and the seating units 12B may form a longitudinal axis LB. In certain embodiments, LA forms an angle a with a center axis C of the overall two-seat unit 26 (wherein the center axis C may be positioned parallel to the center axis C' of the cabin 14), and LB forms an angle b with a center axis C of the overall two-seat unit 26. In some cases, angles a and b may range from 5 degrees to 15 degrees. In certain embodiments, angles a and b may be equal in magnitude but opposite in direction relative to the center axis C. The angles a and b are shallow enough relative to the center axis C to be considered forward facing.

In these two-seat unit 26, the seating units 12A, 12B are angled with respect to each other so that a distance between the head ends 34 is less than a distance between the foot ends 36. As a result, in the bed position of each seating unit 12A, 12B, the passengers' feet are either angled toward an aisle 28 (for the columns that are positioned adjacent an aisle 28) or toward an exterior wall 30 of the cabin 14 (for the columns that are positioned adjacent the exterior wall 30). In certain embodiments, this angled arrangement for each two-seat unit 26 is referred to as a "paired herringbone" pattern.

With respect to the columns 24A, 24B that are positioned adjacent the exterior wall 30, the shape of the wall 30 limits the amount of height available for upright sitting and head room. By angling the seating units 12A, 12B so that the foot ends 36 are positioned in the concave space of the exterior wall 30 and limiting the height of at least a lateral-most portion 38 of each foot end 36 to fit within the dimensions of the concave space, the bed positions are arranged so that the foot ends 36 (which do not require the additional height) are positioned in the concave space, thus allowing the concave space to be more efficiently utilized, as best illustrated in FIG. 7.

With respect to the columns 24A, 24B that are positioned adjacent the aisle 28, the space typically needed in the aisle at or above a delineating height (upper region) is greater than the amount of space needed in the aisle below the delineating height (lower region). According to current aircraft regulations, 25 inches is the delineating height between the narrower lower region of the aisle 28 and the wider upper region of the aisle 28. In other words, the narrower lower region of the aisle 28 is defined under current aircraft regulations as being the area of the aisle below 25 inches, and the wider upper region of the aisle 28 is defined under current aircraft regulations as being the area of the aisle at or above 25 inches. However, the setpoint for the delineating height may be increased or decreased as needed or desired in future regulations, and the current design may be adjusted to conform to those changes in the delineating height setpoint.

Furthermore, current aircraft regulations also govern the minimum widths of the narrower lower region of the aisle 28 and the wider upper region of the aisle 28. For example, current regulations require a minimum aisle width of 15 inches for the narrower lower region, and require a minimum aisle width of 21 for the wider upper region. However, the setpoint for one or both minimum widths may be increased or decreased as needed or desired in future regulations, and the current design may be adjusted to conform to those changes in the minimum widths.

The choice for the vertical setpoint of the delineating height is primarily chosen based on the fact that an average person's upper torso is wider than his or her lower torso, as best illustrated in FIG. 7. By angling the seating units 12A, 12B so that the foot ends 36 are positioned closest to the aisle 28 and limiting the height of an upper surface of at least the lateral-most portion 38 of each foot end 36 (the height-limited portion 38) to remain below the delineating height, the bed positions can be arranged so that the foot ends 36 (which do not require the additional height) are positioned in the narrower lower portion of the aisle 28 that requires less width for passenger comfort. In certain embodiments, when the person's feet are placed inside the foot well 22A, 22B, the surface upon which the person's feet rest inside the foot well 22A, 22B may be as much as 12-13 inches below the delineating height to allow for a height of the person's feet inside the foot well 22A, 22B and to maintain the upper surface of the foot well 22A, 22B below the delineating height, as shown in FIG. 7.

As a result, the aisle 28 may have a narrower lower region below the delineating height that is only as wide as the minimum required width (which is under the current regulations is 15 inches, but may be larger or smaller depending on changes in the current regulations), while having a wider upper region at or above the delineating height (which under the current regulations is 21 inches, but may be larger or smaller depending on changes in the current regulations). The difference in widths between the wider upper region and the narrower lower region is achieved by the lateral dimension of the height-limited portion 38 of each foot end 36.

Figure 11:
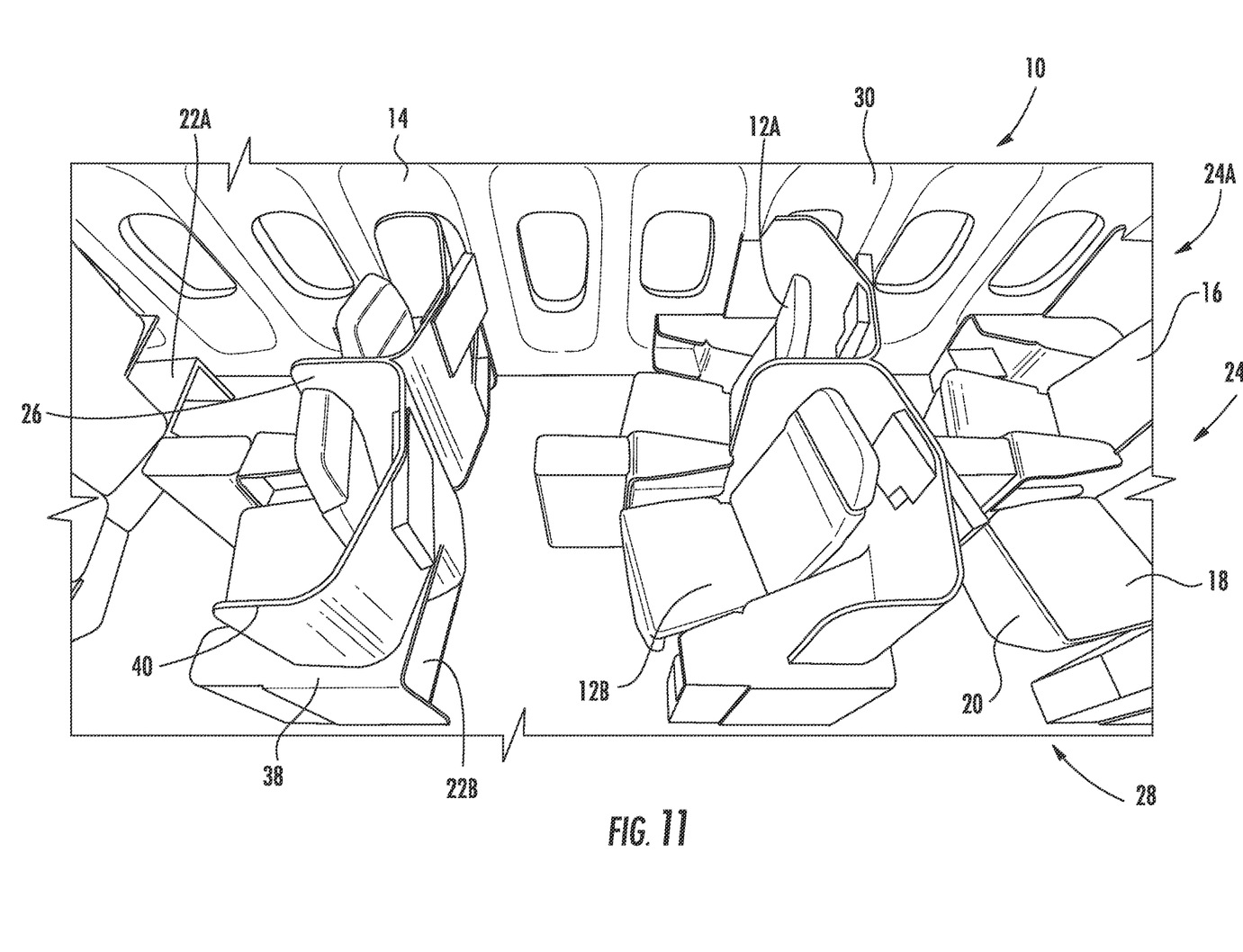
FIG. 11 is a perspective view of a multiple two-seat units in an upright configuration, according to certain embodiments of the present invention.

For example, the lateral dimension of the height-limited portion 38 of each foot end 36 may range from approximately 1 inch to approximately 5 inches. In certain embodiments, the height-limited portion 38 of the foot ends 36 may comprise a lateral portion of each foot well 22A, 22B, as best illustrated in FIG. 11. As shown in these embodiments, to achieve the height-limited portion 38 of the foot ends 36, a privacy shell 40 around each seating unit 12A, 12B is recessed from a lateral edge of the foot well 22A, 22B by a distance that corresponds to the lateral dimension of the height-limited portion 38.

In certain embodiments, the dimensions of the foot ends 36 may be the same for both seating units 12A, 12B, regardless of whether the foot end 36 is positioned adjacent the aisle 28 or in the concave space of the exterior wall 30. In other embodiments, there may be a desire to alter the dimensions of the foot end 36 adjacent the concave space of the exterior wall 30 so that the foot end 36 is able to extend above the delineating height, particularly in cases where the concave space may have a taller vertical dimension and thus allow for potential staggering or additional overlap of the seating units 12A, 12B in the bed positions if such additional compacting is desired.

By better utilizing the space in the narrower lower region for the bed positions, the arrangement 10 is able to achieve a pitch per passenger of greater than 9 and less than 10.5 without the need to stagger the seating units 12A, 12B or overlap any portion of the seating units 12A, 12B. As a result, every bed position may be positioned at substantially the same height so that the passengers do not have to experience an overlapping bed arrangement, which tends to reduce the sense of privacy and comfort.

In certain embodiments, as shown in FIGS. 1-4, an arrangement may include three sets of columns 24A, 24B, wherein one pair of columns 24A, 24B is positioned between the exterior wall 30 and the aisle 28, a second pair of columns 24A, 24B is positioned between the aisle 28 and a second aisle 28, and a third pair of columns 24A, 24B is positioned between the second aisle 28 and the opposing exterior wall 30. This arrangement 10 may also be referred to as a six abreast arrangement or a 2-2-2 arrangement. Such an arrangement may be used in wide body (two aisle) aircraft, such as Boeing 777X, 777 (FIGS. 4, 6), 787 (FIG. 2), 767, and 747 aircraft; and Airbus 380, 350 (FIG. 3), 340, and 330 (FIG. 1) aircraft.

In some embodiments, the seating units between the two aisles 28 may comprise a single column of seating units, which may be either column 24A or 24B. This arrangement 10 may also be referred to as a five abreast arrangement or a 2-1-2 arrangement. Such an arrangement may be used in wide body (two aisle) aircraft, such as Boeing 777X, 777, 787, 767, and 747 aircraft; and Airbus 380, 350, 340, and 330 aircraft.

Figure 1:
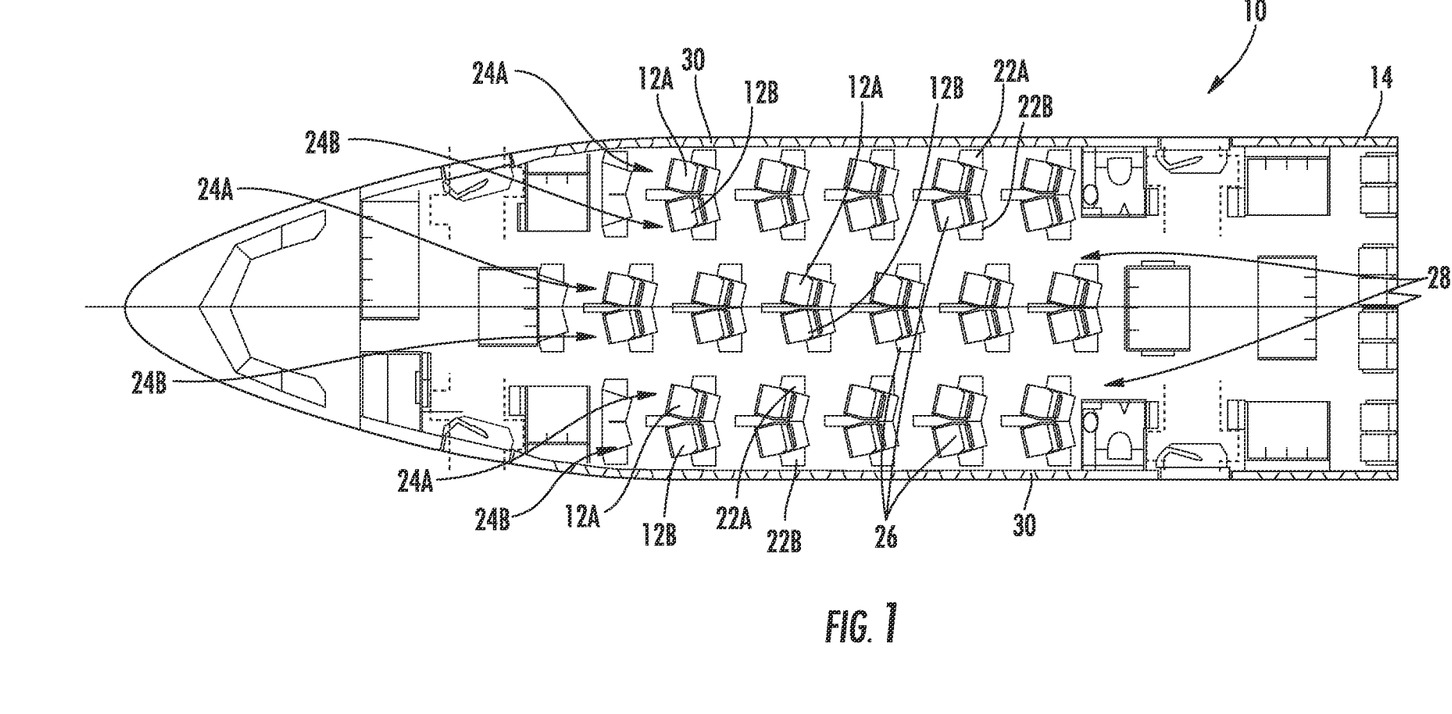
FIG. 1 is a top view of a seating arrangement, according to certain embodiments of the present invention.
Figure 2:
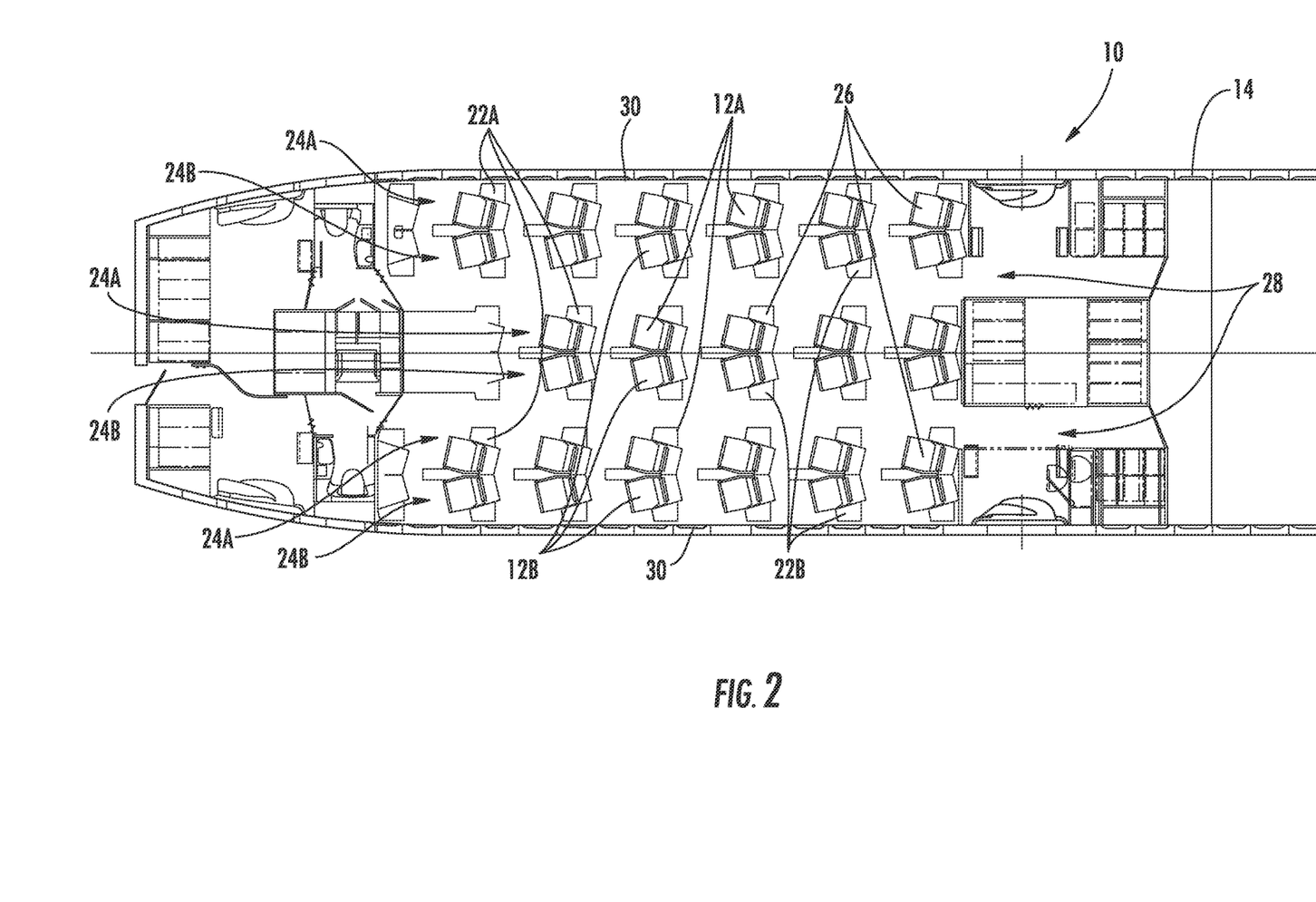
FIG. 2 is a top view of a seating arrangement, according to certain embodiments of the present invention.
Figure 3:
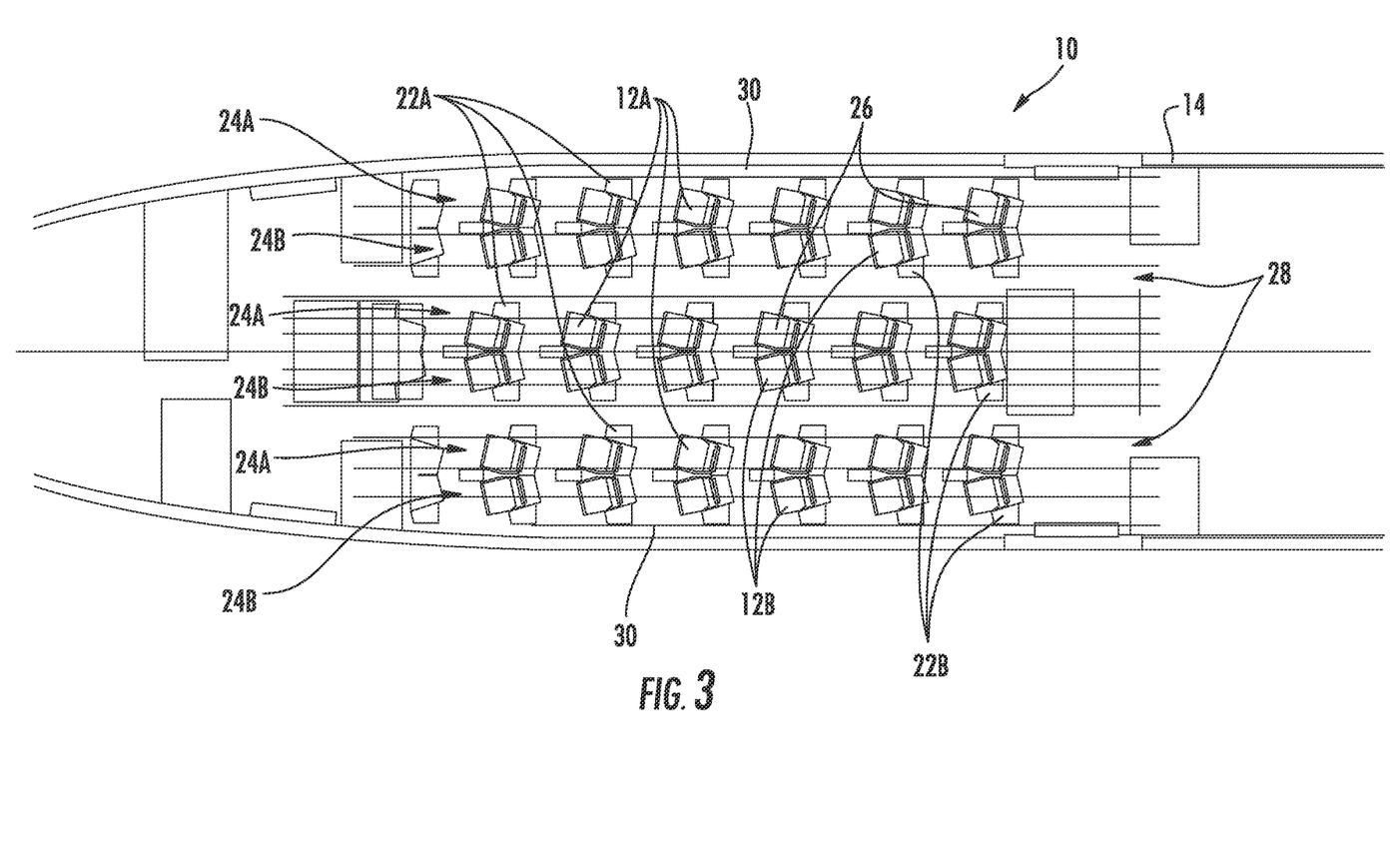
FIG. 3 is a top view of a seating arrangement, according to certain embodiments of the present invention.
Figure 4:
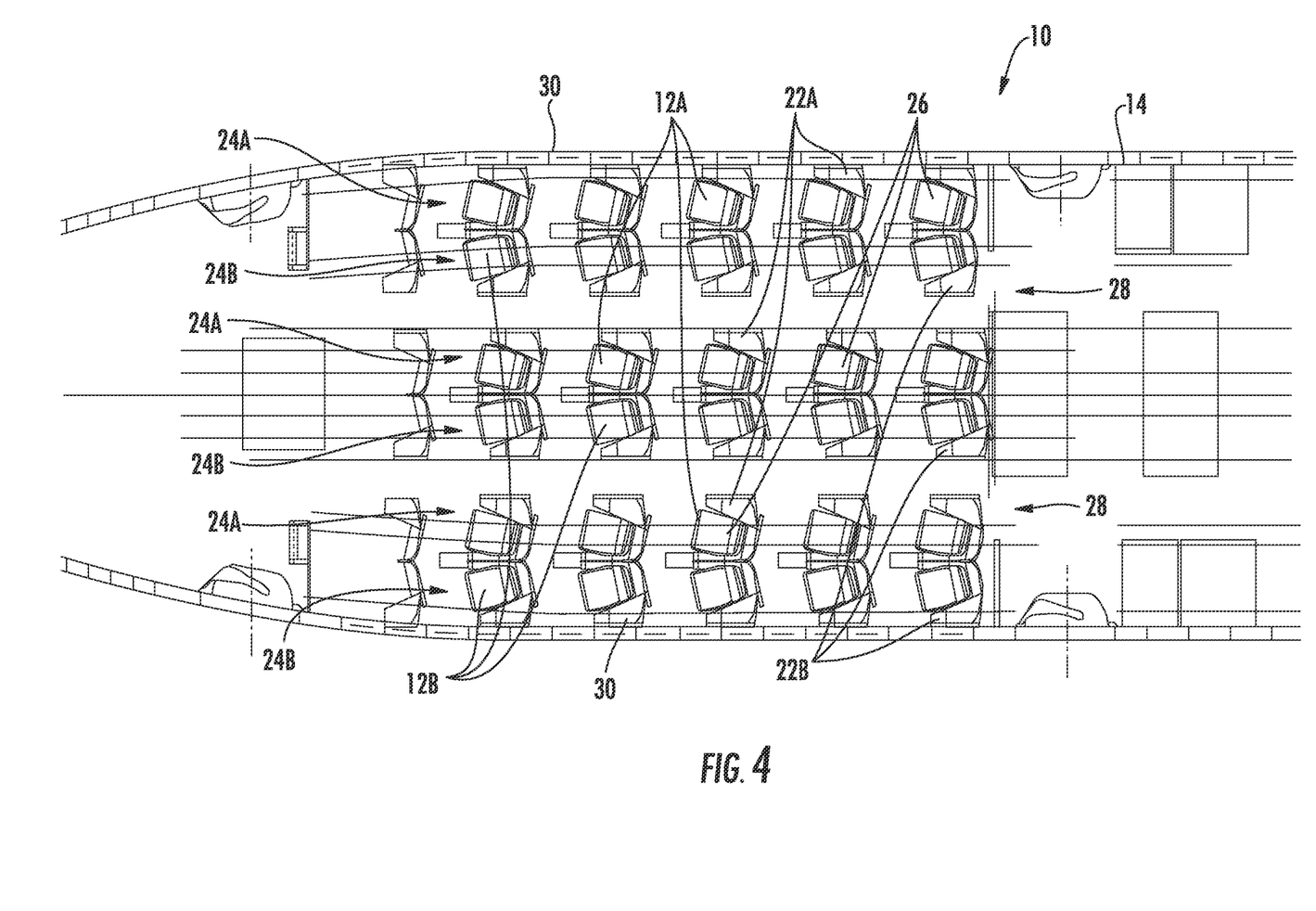
FIG. 4 is a top view of a seating arrangement, according to certain embodiments of the present invention.
Figure 5:
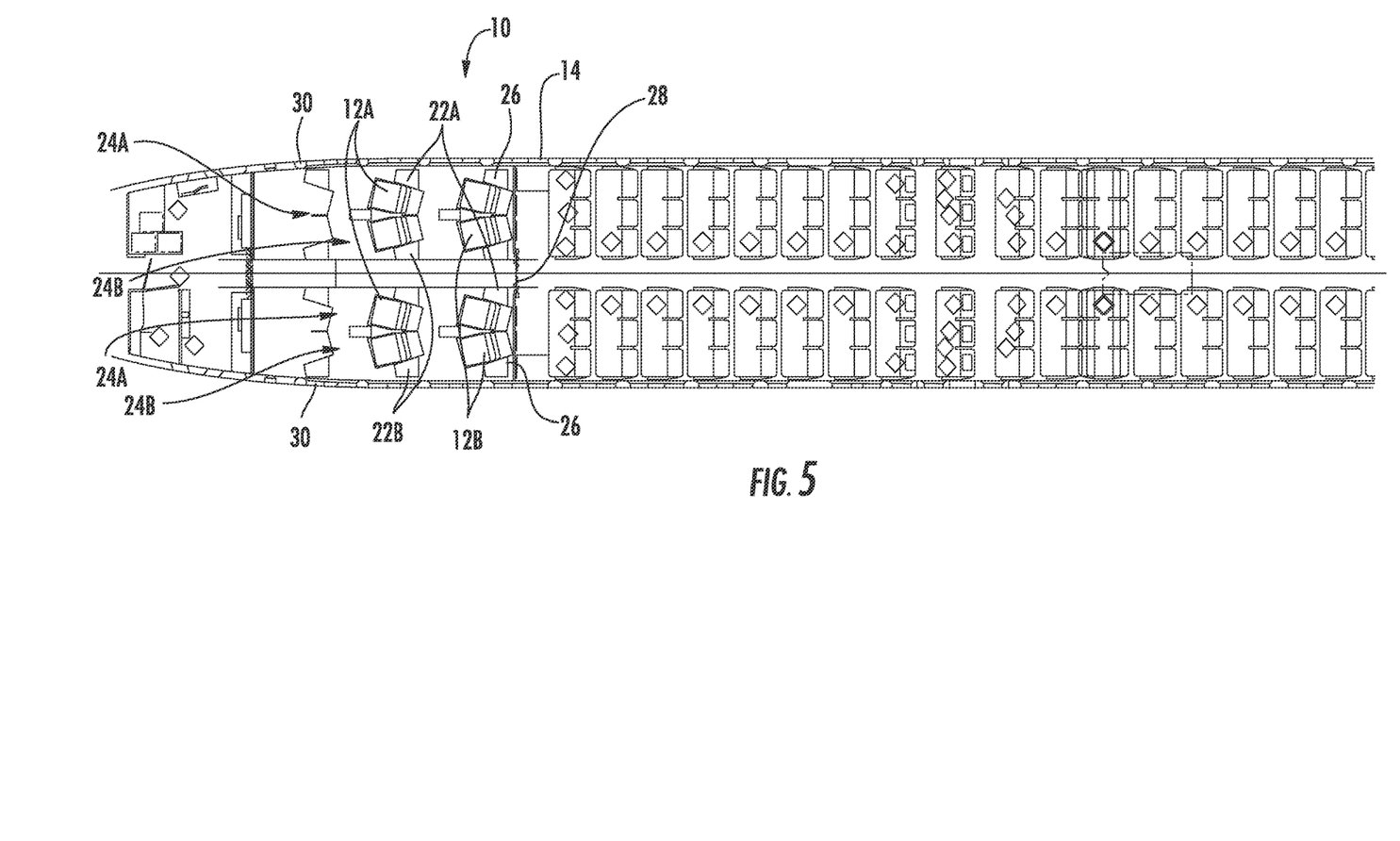
FIG. 5 is a top view of a seating arrangement, according to certain embodiments of the present invention.
Figure 6:
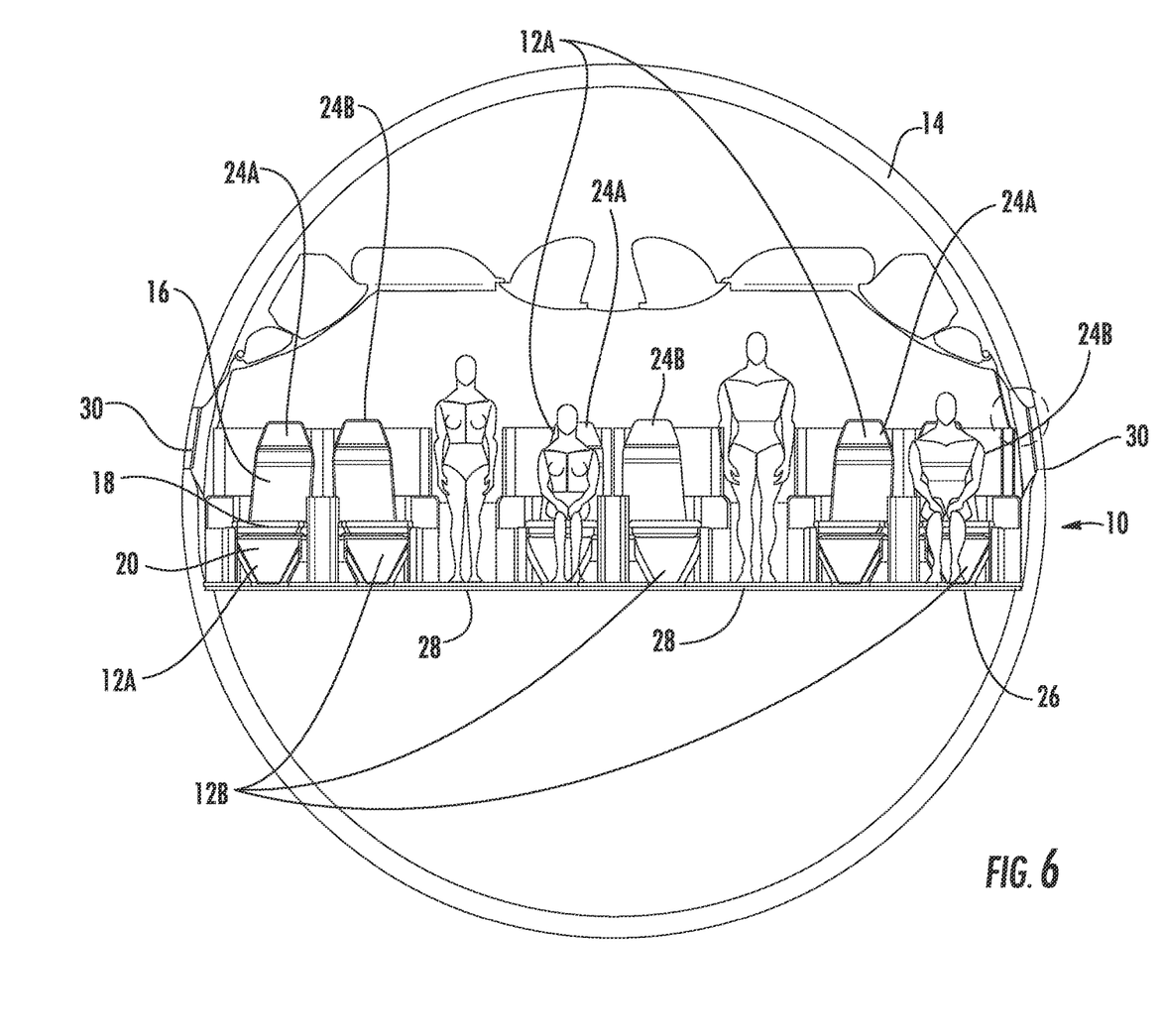
FIG. 6 is a front view of a seating arrangement, according to certain embodiments of the present invention.

In further embodiments, as shown in FIG. 5, an arrangement may include two sets of columns 24A, 24B, wherein one pair of columns 24A, 24B is positioned between the exterior wall 30 and the aisle 28, and a second pair of columns 24A, 24B is positioned between the aisle 28 and the opposing exterior wall 30. This arrangement 10 may also be referred to as a four abreast arrangement or a 2-2 arrangement. Such an arrangement may be used in narrow body (single aisle) aircraft, such as Boeing 737 aircraft (FIG. 5), Airbus 320 aircraft, and Bombadier CRJ aircraft.

In yet other arrangements, an arrangement may include one set of columns 24A, 24B, wherein one pair of columns 24A, 24B is positioned between the exterior wall 30 and the aisle 28, and a single column 24A, 24B is positioned between the aisle 28 and the opposing exterior wall 30. This arrangement 10 may also be referred to as a three abreast arrangement or a 2-1 arrangement. Such an arrangement may also be used in narrow body (single aisle) aircraft, such as Boeing 737 aircraft (FIG. 5), Airbus 320 aircraft, and Bombadier CRJ aircraft.

For example, as shown in FIGS. 1-4, because the two-seat units 26 are able to more efficiently utilize the space in the narrower lower region and the concave space in the exterior walls 30, the arrangement 10 is able allow for a six abreast configuration on wide body aircraft, whereas the conventional maximum arrangement has been a four abreast configuration (two seats between two aisles and one seat between each aisle and one of the exterior walls).

A person of ordinary skill in the relevant art will understand that, depending on bed dimensions, seat widths, cabin dimensions, etc., other combinations of columns 24A, 24B may be possible to achieve the desired number of seats abreast the cabin 14.

In other embodiments, the laterally adjacent seating units may be integrally formed or connected as a double, triple, quad, or other suitably-sized seat unit.

Different arrangements of the components depicted in the drawings or described above, as well as components and steps not shown or described are possible. Similarly, some features and sub-combinations are useful and may be employed without reference to other features and sub-combinations. Embodiments of the invention have been described for illustrative and not restrictive purposes, and alternative embodiments will become apparent to readers of this patent. Accordingly, the present invention is not limited to the embodiments described above or depicted in the drawings, and various embodiments and modifications may be made without departing from the scope of the claims below.

That which is claimed is:

1. A seating arrangement comprising:
at least one set of columns comprising an aisle column of seating units positioned adjacent a wall column of seating units, wherein the aisle column is positioned adjacent an aisle, and the wall column is positioned adjacent an exterior wall;
wherein each seating unit comprises a bed position having a head end and a foot end, wherein at least a height-limited portion of the foot end is below a delineating height that separates a lower portion of the aisle from a upper portion of the aisle;
wherein the seating units in the adjacent columns are longitudinally aligned without any overlap in a longitudinal direction and positioned adjacent one another to form two-seat units, each two-seat unit comprising one seating unit from the aisle column and one seating unit from the wall column, wherein an angle of each seating unit in the aisle column is equal in magnitude and opposite direction to an angle of each seating unit in the wall column so that a distance between the head ends is less than a distance between the foot ends;
wherein the height-limited portion of the foot ends in the aisle column of seating units is positioned adjacent the aisle so that the lower portion of the aisle below the delineating height is narrower than the upper portion of the aisle at or above the delineating height; and wherein the height-limited portion of the foot ends in the wall column of seating units is positioned within a concave portion of the exterior wall.

2. The seating arrangement of claim 1, wherein each seating unit comprises a longitudinal axis that forms an angle with a center axis of the two-seat unit.

3. The seating arrangement of claim 2, wherein each angle has a magnitude of 5 degrees to 15 degrees.

4. The seating arrangement of claim 1, wherein a width of the aisle below the delineating height is a minimum required width of an aircraft aisle below the delineating height.

5. The seating arrangement of claim 4, wherein the width of the aisle below the delineating height is 15 inches.

6. The seating arrangement of claim 5, wherein the delineating height is 25 inches.

7. The seating arrangement of claim 1, wherein a width of the aisle at or above the delineating height is a minimum required width of an aircraft aisle at or above the delineating height.

8. The seating arrangement of claim 7, wherein the width of the aisle at or above the delineating height is 21 inches.

9. The seating arrangement of claim 8, wherein the delineating height is 25 inches.

10. The seating arrangement of claim 1, wherein a lateral dimension of the height-limited portion of each foot end is approximately 1 inch to approximately 5 inches.

11. The seating arrangement of claim 1, wherein the seating arrangement has a pitch per passenger of greater than 9 and less than 10.5.

12. The seating arrangement of claim 1, wherein the bed positions of the seating units in the aisle column and the bed positions of the seating units in the wall column do not overlap.

13. The seating arrangement of claim 1, wherein the bed positions of the seating units are all arranged at substantially a same height.

14. The seating arrangement of claim 1, further comprising a second set of columns, wherein the aisle column is positioned adjacent the aisle, and the wall column is positioned adjacent a second exterior wall.

15. The seating arrangement of claim 14, wherein the seating arrangement is positioned in a narrow body aircraft.

16. The seating arrangement of claim 14, further comprising a third set of columns and a second aisle, wherein the aisle column and the wall column are positioned between the two aisles.

17. The seating arrangement of claim 16, wherein the seating arrangement is positioned in a wide body aircraft.

18. A seating arrangement comprising:
at least one set of columns comprising an aisle column of seating units positioned adjacent a wall column of seating units, wherein the aisle column is positioned adjacent an aisle, and the wall column is positioned adjacent an exterior wall;
wherein each seating unit comprises a bed position having a head end and a foot end, wherein at least a height-limited portion of the foot end is less than a delineating height that separates a lower portion of the aisle from a upper portion of the aisle;
wherein the seating units in the adjacent columns are longitudinally and laterally aligned and positioned adjacent one another to form two-seat units, each two-seat unit comprising one seating unit from the aisle column and one seating unit from the wall column, wherein an angle of each seating unit in the aisle column is equal in magnitude and opposite direction to an angle of each seating unit in the wall column so that a distance between the head ends is less than a distance between the foot ends;

wherein the height-limited portion of the foot ends in the aisle column of seating units is positioned adjacent the aisle so that the lower portion of the aisle below the delineating height is narrower than the upper portion of the aisle at or above the delineating height; and wherein the height-limited portion of the foot ends in the wall column of seating units is positioned within a concave portion of the exterior wall.

* * * * *

UNITED STATES PATENT AND TRADEMARK OFFICE
CERTIFICATE OF CORRECTION

| | |
|---|---|
| PATENT NO. | : 11,260,975 B2 |
| APPLICATION NO. | : 15/517657 |
| DATED | : March 1, 2022 |
| INVENTOR(S) | : Felix J. Lorsignol and Matthew Cleary |

Page 1 of 1

It is certified that error appears in the above-identified patent and that said Letters Patent is hereby corrected as shown below:

On the Title Page

Related U.S. Application Data:
In (60) Line 2: Replace "2015" with --2014--.

Signed and Sealed this
Twenty-first Day of June, 2022

*Katherine Kelly Vidal*

Katherine Kelly Vidal
*Director of the United States Patent and Trademark Office*